United States Patent
Bhalla et al.

(10) Patent No.: US 11,726,339 B2
(45) Date of Patent: Aug. 15, 2023

(54) SYSTEM FOR DIGITAL RECORDING PROTECTION AND ELECTROCHROMIC DEVICE FRAME

(71) Applicant: Samsung Electronics Co., Ltd., Suwon-si (KR)

(72) Inventors: Sameer Bhalla, San Francisco, CA (US); Chandni Kabra, San Francisco, CA (US); Ji-Yeon Lee, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/538,886

(22) Filed: Nov. 30, 2021

(65) Prior Publication Data

US 2023/0168517 A1  Jun. 1, 2023

(51) Int. Cl.
*G02B 27/01* (2006.01)
(52) U.S. Cl.
CPC ..... *G02B 27/0176* (2013.01); *G02B 27/0172* (2013.01); *G02B 2027/0138* (2013.01); *G02B 2027/0178* (2013.01)
(58) Field of Classification Search
CPC ........ G02B 27/0172; G02B 2027/0138; G02B 2027/0178; G06F 3/011–015
See application file for complete search history.

(56) References Cited

U.S. PATENT DOCUMENTS

| | | | |
|---|---|---|---|
| 10,028,089 B2 | 7/2018 | Na et al. | |
| 10,502,815 B2 | 12/2019 | Smits | |
| 10,852,540 B2 | 12/2020 | Osterhout et al. | |
| 11,182,970 B1* | 11/2021 | Kathol | G06T 19/006 |
| 2020/0050023 A1 | 2/2020 | Vasiliev et al. | |
| 2020/0292907 A1 | 9/2020 | Wang | |
| 2021/0055563 A1 | 2/2021 | Bouchier et al. | |
| 2022/0121292 A1* | 4/2022 | Lin | G06F 3/0304 |

FOREIGN PATENT DOCUMENTS

| | | |
|---|---|---|
| KR | 1526783 B | 12/2013 |
| KR | 1661555 B | 1/2016 |
| KR | 10-20170009658 A | 1/2017 |
| KR | 10-20170098214 A | 8/2017 |
| KR | 10-20190005006 A | 1/2019 |
| KR | 10-2020-0118197 A | 10/2020 |
| KR | 10-2321470 B1 | 11/2021 |

OTHER PUBLICATIONS

International Search Report and Written Opinion dated Feb. 24, 2023 for International Application PCT/ KR2022/019058, from Korean Intellectual Property Office, pp. 1-8, Republic of Korea.

* cited by examiner

*Primary Examiner* — Hang Lin

(74) *Attorney, Agent, or Firm* — Sherman IP LLP; Kenneth L. Sherman; Hemavathy Perumal

(57) ABSTRACT

An augmented reality (AR) device includes a frame and multiple front facing cameras connected with the frame. A first electrochromic material is connected with the frame, removably connected to a power source, and disposed over the multiple front facing cameras. AR display circuitry is connected to the frame and the power source. A mode state of the AR device is modified based on a detected do-not-record permission.

20 Claims, 17 Drawing Sheets

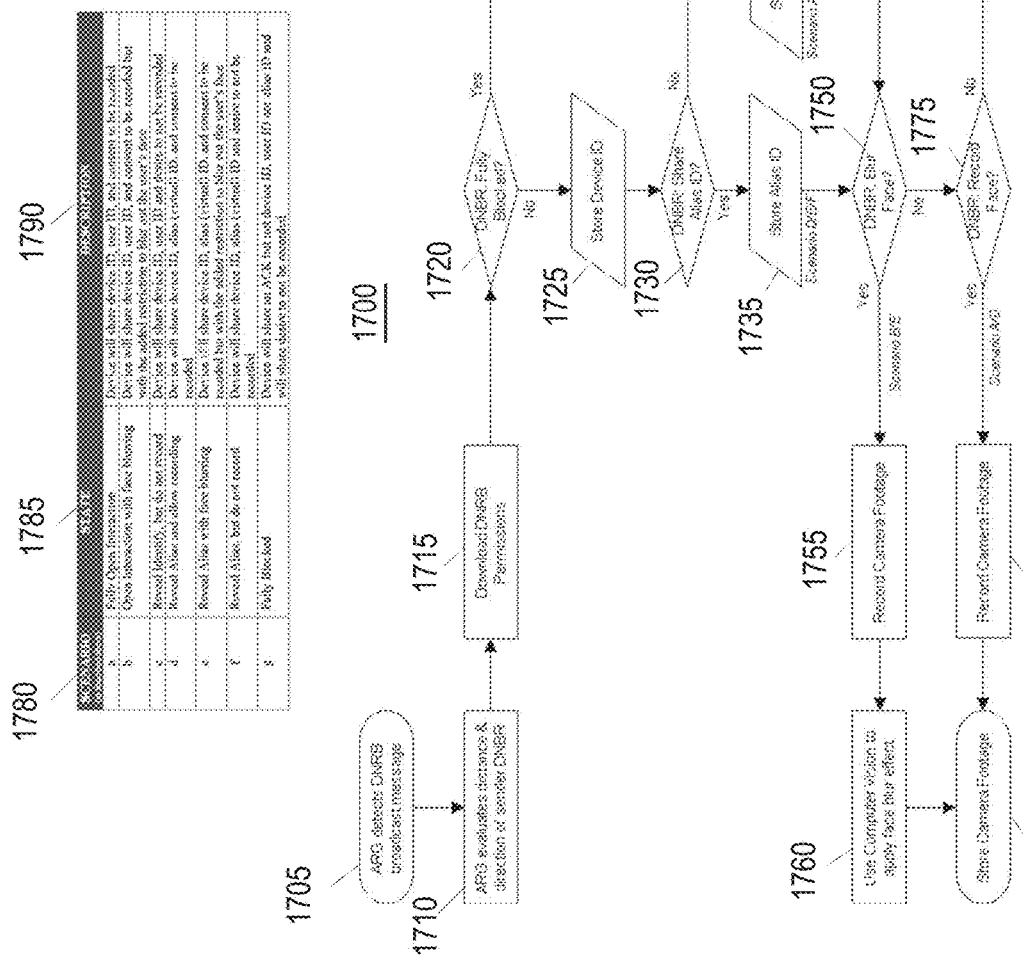

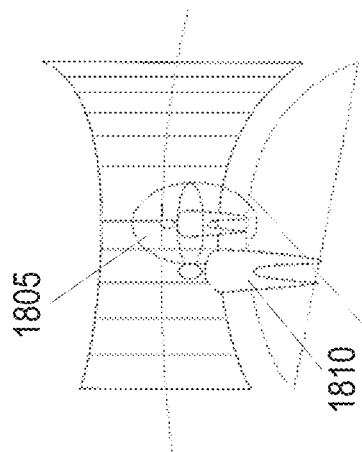
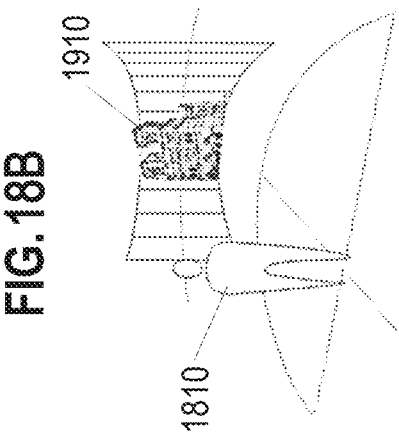
FIG. 18B
FIG. 19B
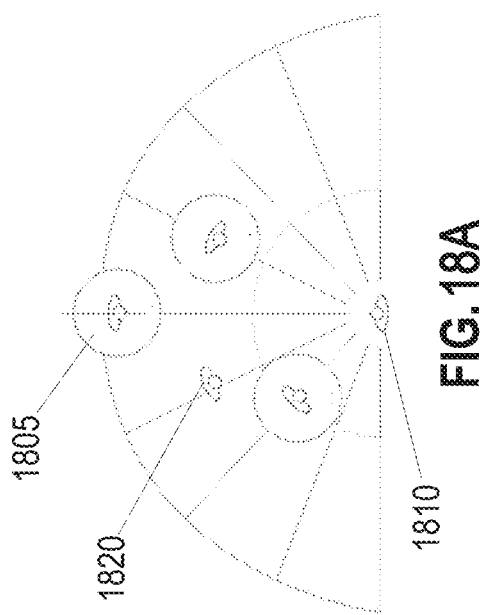
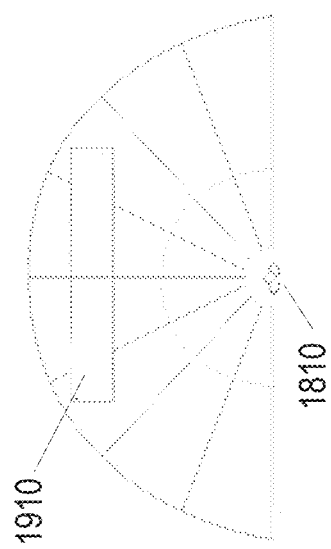
FIG. 18A
FIG. 19A

SYSTEM FOR DIGITAL RECORDING PROTECTION AND ELECTROCHROMIC DEVICE FRAME

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to augmented reality (AR) systems, and in particular, to digital recording protection with AR devices.

BACKGROUND

As the proliferation of digital devices continues to increase, the number of cameras in personal and private spaces also continues to increase. These image sensors are "free" in that the user can take a picture of anyone they want and whenever they want. Privacy also continues to be a growing concern. Wireless carriers in certain countries and some governments have mandated, or at a minimum signaled an intent to mandate, regulations around enforcing a shutter sound on camera phones as a form of awareness of privacy.

SUMMARY

One or more embodiments relate to digital recording protection with augmented reality (AR) devices. In one embodiment, an AR device includes a frame and multiple front facing cameras connected with the frame. A first electrochromic material is connected with the frame, removably connected to a power source, and disposed over the multiple front facing cameras. AR display circuitry is connected to the frame and the power source. A mode state of the AR device is modified based on a detected do-not-record permission.

In another embodiment, an AR wearable device includes a frame connected with a first folding arm and a second folding arm. Multiple front facing cameras are connected with the frame. A first electrochromic material is connected with the frame, removably coupled to a power source, and disposed over the multiple front facing cameras. AR display circuitry is connected with the frame and the power source. A mode state of the AR wearable device provides a viewable indication based on charging or discharging of energy from the first electrochromic material.

In one embodiment, a method for wearable device image recording privacy includes detecting, by an AR device including at least one camera, a signal or informative image. Information from the signal or the informative image is extracted for determining do-not-record permission. A zone for the determined do-not-record permission is determined. The AR device detects a current location with respect to the zone. An electrochromic material of the AR device or a recorded image result is modified based on the determined do-not-record permission.

These and other features, aspects and advantages of the one or more embodiments will become understood with reference to the following description, appended claims and accompanying figures.

BRIEF DESCRIPTION OF THE DRAWINGS

FIG. 17A shows a flow diagram for a DNR personal signal or beacon being present for the AR digital glasses with recording protection, according to some embodiments.

FIG. 17B shows a table for different scenarios, the state and description for the flow diagram in FIG. 17A, according to some embodiments.

FIGS. 18A-B show an example of signal or beacon zones used for multiple DNR zones or for zones where recording is allowed for persons present in view of the AR digital glasses that have recording protection, according to some embodiments.

FIGS. 19A-B shows an example of a DNR signal or beacon zone for a building or structure in view of the AR digital glasses with recording protection, according to some embodiments.

DETAILED DESCRIPTION

Figure 1:
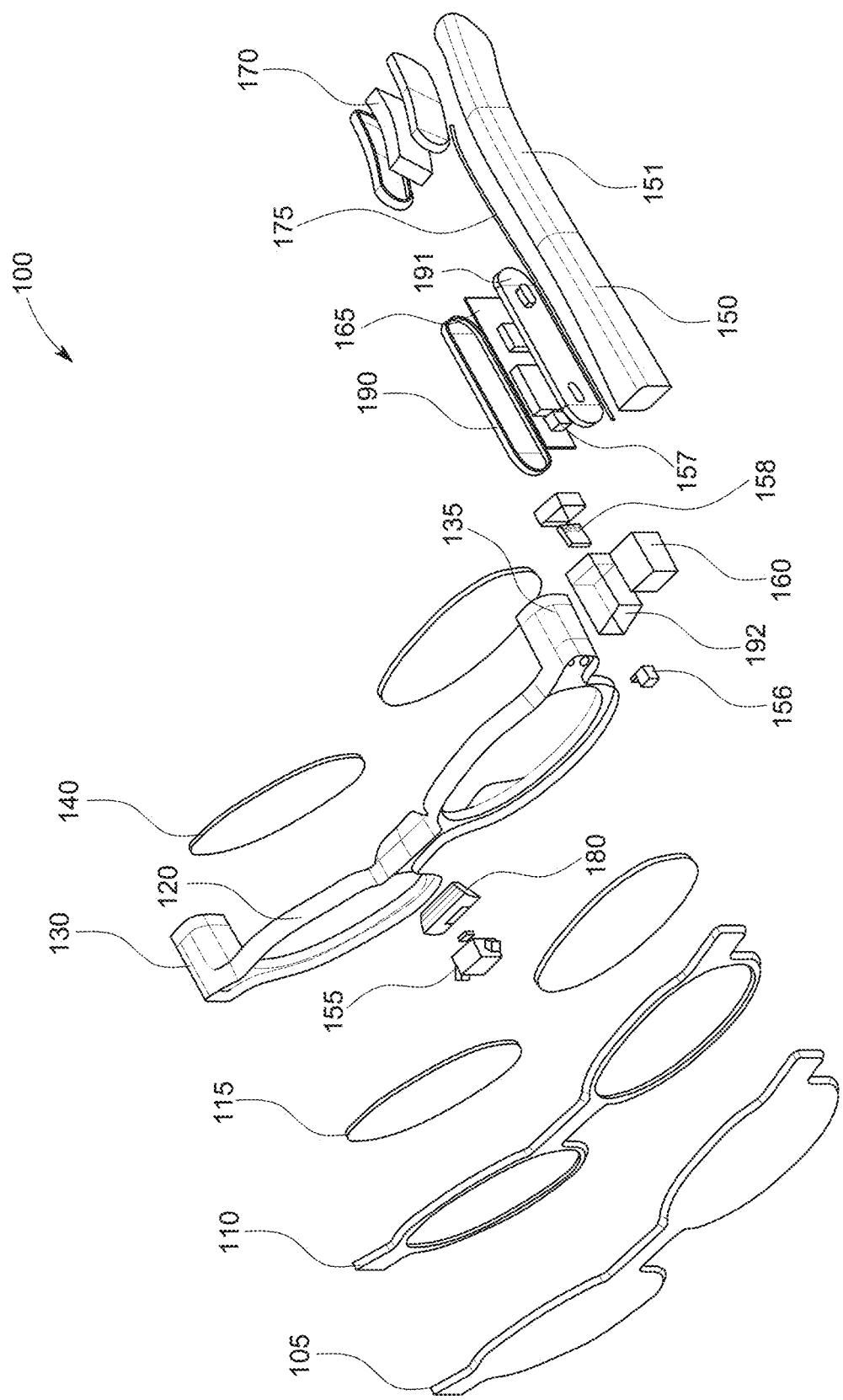
FIG. 1 shows an exploded view of an augmented reality (AR) digital glasses with recording protection, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate to digital recording protection with augmented reality (AR) devices. In one embodiment, an AR device includes a frame and multiple front facing cameras connected with the frame. A first electrochromic material is connected with the frame, removably connected to a power source, and disposed over the multiple front facing cameras. AR display circuitry is connected to the frame and the power source. A mode state of the AR device is modified based on a detected do-not-record permission.

Some embodiments solve the problem of providing a privacy system that enables trust with the user by providing them with control of their digital presence and transparency of what their AR device is doing in the wearable and smartphone space. The problem regarding privacy will only amplify as more cameras and sensors become omnipresent in public and private settings.

Existing consumer electronics products are typically made of materials, which at the time of production are set with a single state of light transparency through it. That is—the production of that material allows for only a set level of light to pass through it, and this cannot be modified after production. For example, if the designer of an electronic product wants 50% of light to pass through, this will reveal a semi-opaque view of the electronics contained within; and this cannot change once the manufacturing process is complete as well as throughout the life of the product. The consumer product landscape does not exhibit an electronic product that has the ability to modify the transparency level of the encompassing material that is being used to house a consumer electronics product after time of manufacture—that is there is no dynamic ability to adjust the amount of light that is passed through the enclosing structure of the consumer electronic device.

Though there has always been a sensitivity around being recorded in public, recent data breaches and people's increased usage of digital products has increased society's sensitivity towards privacy concerns—both digital and physical. For example, with video recording, the traditional light emitting diode (LED) showing "LED on" on a camera indicates that the camera is recording, but can easily be circumvented and may be socially unacceptable. The only true method to ensure that a camera is not recording something is to physically occlude the light passing through to the camera sensor.

Mechanical camera lens covers come in either manual or automatic configurations. Manual camera covers are usually bulky and only work when the user remembers to open or close the lens cover. Conventional automatic mechanical camera lens covers usually require motors and power to move a plastic/metal cover over the camera lens and may add significant bulk and power requirements. Additionally, automatic mechanical mechanisms in small form factors add extra cost for their miniaturized properties. Lastly, mechanical mechanisms may have a slow open and close time, which impedes dynamically opening/closing the camera lens in an always-on recording situation.

FIG. 1 shows an exploded view of augmented reality (AR) digital glasses 100 with recording protection, according to some embodiments. In one or more embodiments, the AR digital glasses 100 includes front cover glass 105, electrochromic device (ECD) film (or material) cover 110, wave guide material 115, frame 120, camera housings 130/135, lenses 140 (e.g., prescription, non-prescription), center camera 155 (and other sensors (e.g., motion sensor, microphone(s), temperature sensor, proximity sensor, photoelectric sensor, position sensor (e.g., global positioning system (GPS) sensor or receiver circuitry), a BLU-ETOOTH® receiver or transceiver, etc.)), center camera housing 180, left and right front cameras 156, frame arms 150 with ear pieces 151, battery 170, left and right side cameras 157 and controller (circuitry) 165, side camera housing 190 and 191 for left and right side cameras 157, controller cable 175, left and right hinges 158 with smart connectors 210 (FIG. 2), display engine 160, and left and right side housings 192.

In some embodiments, the AR digital glasses 100 includes ECD film (or material) placed as a front layer of the AR digital glasses (ECD film cover 110) that may block front-facing cameras (center camera 155, left and right front cameras 156), and placed along the internal portions of the frame arms 150 with earpieces 151 that may block side-facing cameras (left and right side cameras 157) and hide other internal components. The controller cable 175 connects ECD film elements to the controller 165 and the battery 170 (e.g., rechargeable battery) for power and data communication. Sensor circuitry is employed for detection of various scenarios that require switching between operation mode states as described below. In some embodiments, the cameras (center camera 155, left and right front cameras 156) record and process the area that a user's head is pointed towards when donning the AR digital glasses 100. In using the AR digital glasses 100, the AR may include overlaying visual, auditory, or other sensory information onto the visualized world in order to enhance the user's experience.

Figure 2:
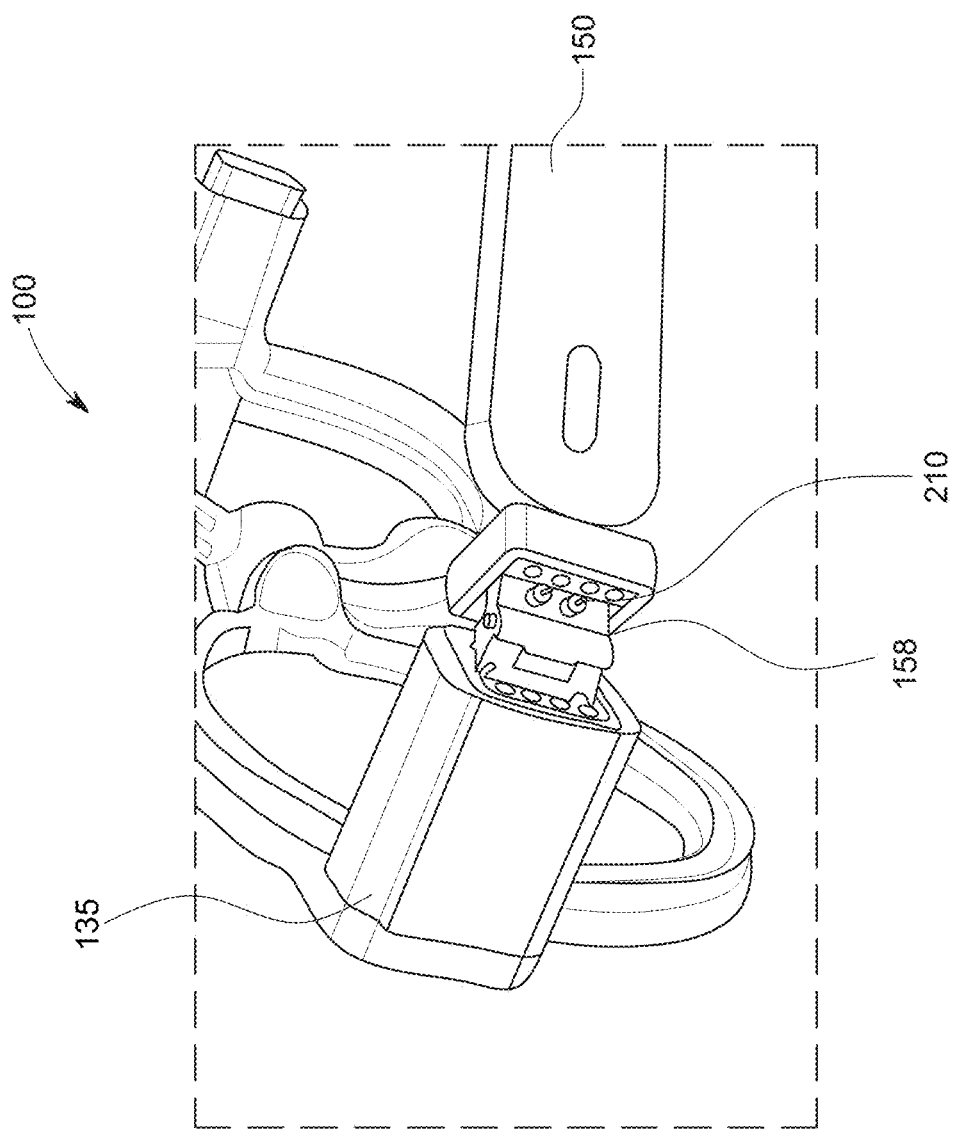
FIG. 2 shows a hinge and smart connector for the AR digital glasses with recording protection, according to some embodiments.

FIG. 2 shows a hinge 158 (either left or right hinges 158) and smart connector 210 for the AR digital glasses 100 (FIG. 1) with recording protection, according to some embodiments. In some embodiments, the hinge 158 with smart connector 210 contains pogo pins that create a mechanical circuit to provide power connection between the battery 170 and the ECD film (ECD film cover 110, and ECD film placed along the internal portions of the frame arms 150 and earpieces 151). In one or more embodiments, by folding the frame arms, the hinge 158 automatically disconnects from the controller 165 and battery 170, which turns the ECD film (ECD film cover 110, and ECD film placed along the internal portions of the frame arms 150 and earpieces 151) from transparent to opaque in order to block the cameras (center camera 155, left and right front cameras 156, left and right side cameras 157). Upon unfolding the frame arms 150 with earpieces 151 (the display engine 160 connects to the battery 170) to wear and experience full features of the AR glasses 100. With the frame arms 150 with earpieces 151 are unfolded, the ECD film layer appears transparent (i.e., appears as ordinary glass) to let the cameras (center camera 155, left and right front cameras 156, left and right side cameras 157) and other sensors see through the outer layers of the AR digital glasses 100. This state is referred to as the AR mode state.

Figures 3A, 3B:
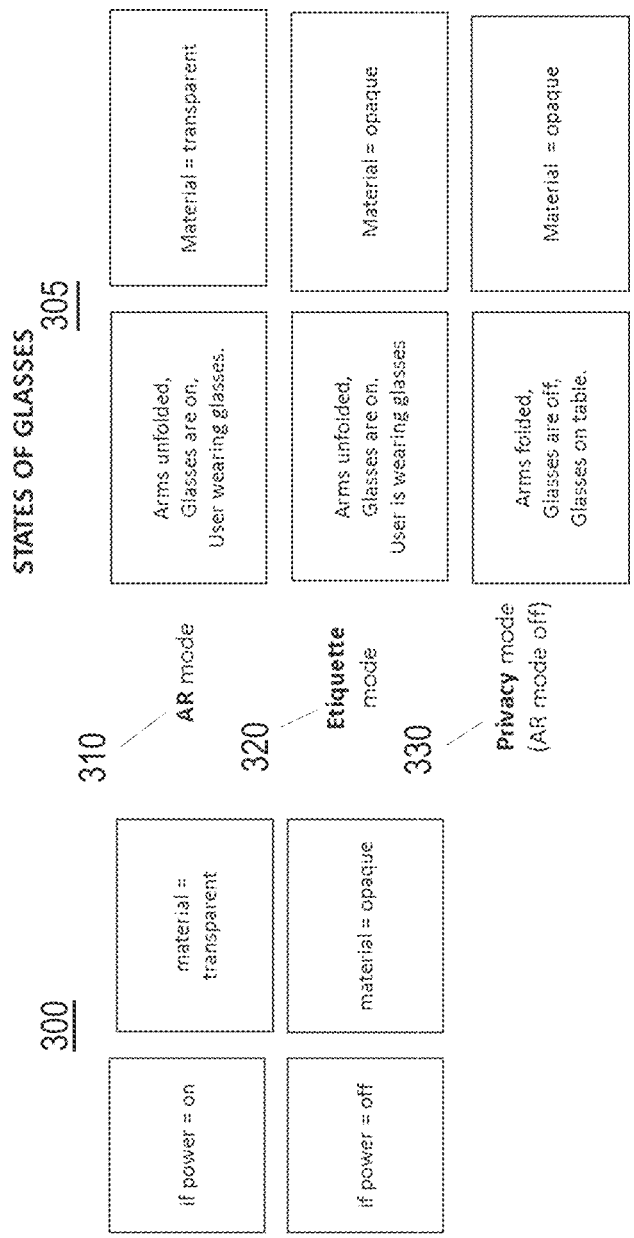
FIG. 3A shows a result of power on and off for electrochromic device (ECD) material employed with the AR digital glasses with recording protection, according to some embodiments.
FIG. 3B shows mode states of the AR digital glasses with recording protection, according to some embodiments.

FIG. 3A shows a result 300 of power on and off for the ECD film (or material) employed with the AR digital glasses 100 (FIG. 1) with recording protection, according to some embodiments. If the power is on (i.e., the frame arms 150 with earpieces 151 are unfolded), the ECD film cover 110 and the ECD film placed along the internal portions of the frame arms 150 with earpieces 151 appear transparent. If the power is off (i.e., the frame arms 150 with earpieces 151 are folded), the ECD film cover 110 and the ECD film placed along the internal portions of the frame arms 150 with earpieces 151 appear opaque (and block or hide the internal components behind the ECD film cover 110 and frame arms 150 with earpieces 151).

FIG. 3B shows mode states 305 of the AR digital glasses 100 (FIG. 1) with recording protection, according to some embodiments. In one or more embodiments, there are three (3) mode states: AR mode state 310, etiquette mode state 320 and privacy mode state 330 (AR mode state is off). In the AR mode state 310, the frame arms 150 with earpieces 151 of the AR digital glasses 100 are unfolded, and the user is wearing the AR digital glasses 100. The ECD film in the AR mode state is transparent (the ECD film cover 110, and ECD film placed along the internal portions of the frame arms 150 and earpieces 151). In the etiquette mode state 320, the frame arms 150 with earpieces 151 of the AR digital glasses 100 are unfolded, and the user is wearing the AR digital glasses 100. The ECD film in the etiquette mode state 320 is opaque (the ECD film cover 110, and ECD film placed along the internal portions of the frame arms 150 and earpieces 151). In the privacy mode state 330, the frame arms 150 with earpieces 151 of the AR digital glasses 100 are folded, and the user is not wearing the AR digital glasses 100 (e.g., on a table, in the user's hand, etc.). The ECD film in the privacy mode state 330 is opaque (the ECD film cover 110, and ECD film placed along the internal portions of the frame arms 150 and earpieces 151).

Figure 4:
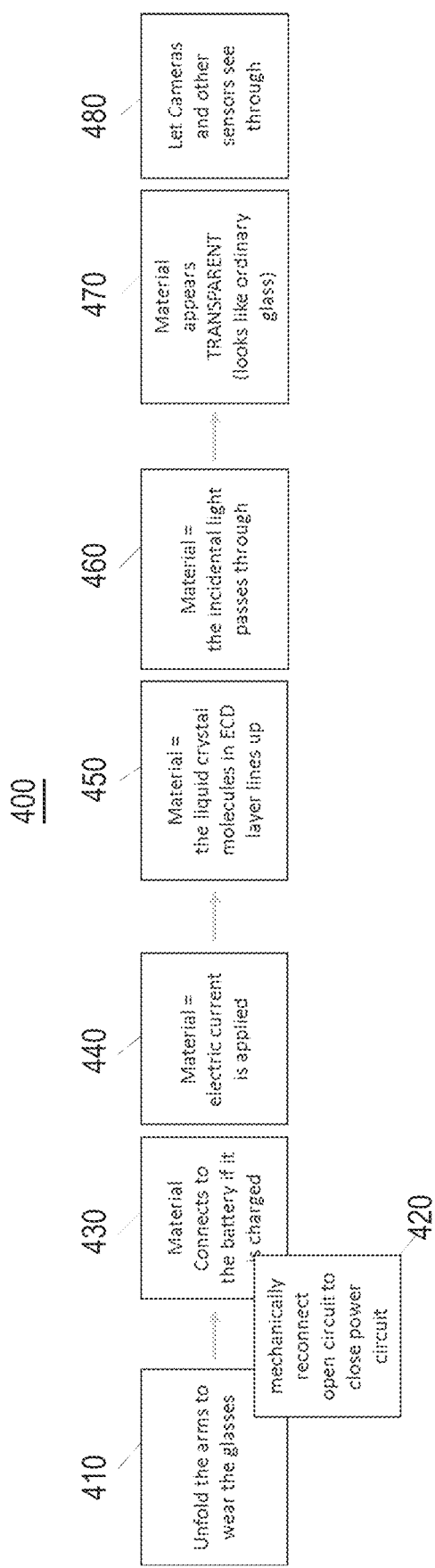
FIG. 4 shows a block flow diagram for an AR mode state for the AR digital glasses with recording protection, according to some embodiments.

FIG. 4 shows a block flow diagram 400 for the AR mode state for the AR digital glasses 100 (FIG. 1) with recording protection, according to some embodiments. In the AR mode state, the ECD film (the ECD film cover 110, and ECD film placed along the internal portions of the frame arms 150 and earpieces 151) removes the physical occlusion between the built-in cameras (center camera 155, left and right front cameras 156, left and right side cameras 157) and the environment and outwardly lets the other people in public see that the cameras are present and in use, therefore eliminating any doubt that the cameras are on. Thus, a first step to starting build trust in the technology, which eventually may lead to societal acceptance of the technology. Having only an LED indicator set to "off" while the camera is not operating does not digitally or physically guarantee that they are really off, which could quickly raise privacy concerns. Additionally, in the AR mode state the internal circuitry is visible and not being hidden; again with this level of full disclosure helping to establish trust with users.

In some embodiments, in block 410, the user unfolds the frame arms 150 and earpieces 151 to wear the AR digital glasses 100. In block 420, the unfolding of the frame arms 150 and earpieces 151 mechanically reconnects the open circuit caused by the left and right hinges 158 to close the power circuit with the battery 170. In block 430, the ECD film (the ECD film cover 110, and ECD film placed along the internal portions of the frame arms 150 and earpieces 151) connects to the battery 170 (if the battery 170 is charged). In block 440 the state of the ECD film has the electric current applied such that in block 450 the liquid crystal molecules in the ECD film line up. In block 460 the incidental light passes through the ECD film, and the ECD film appears transparent (i.e., looks like ordinary glass) in block 470. In block 480 the cameras, sensors, lighting and internal components may be seen through the housing elements of the AR digital glasses 100.

Figure 5:
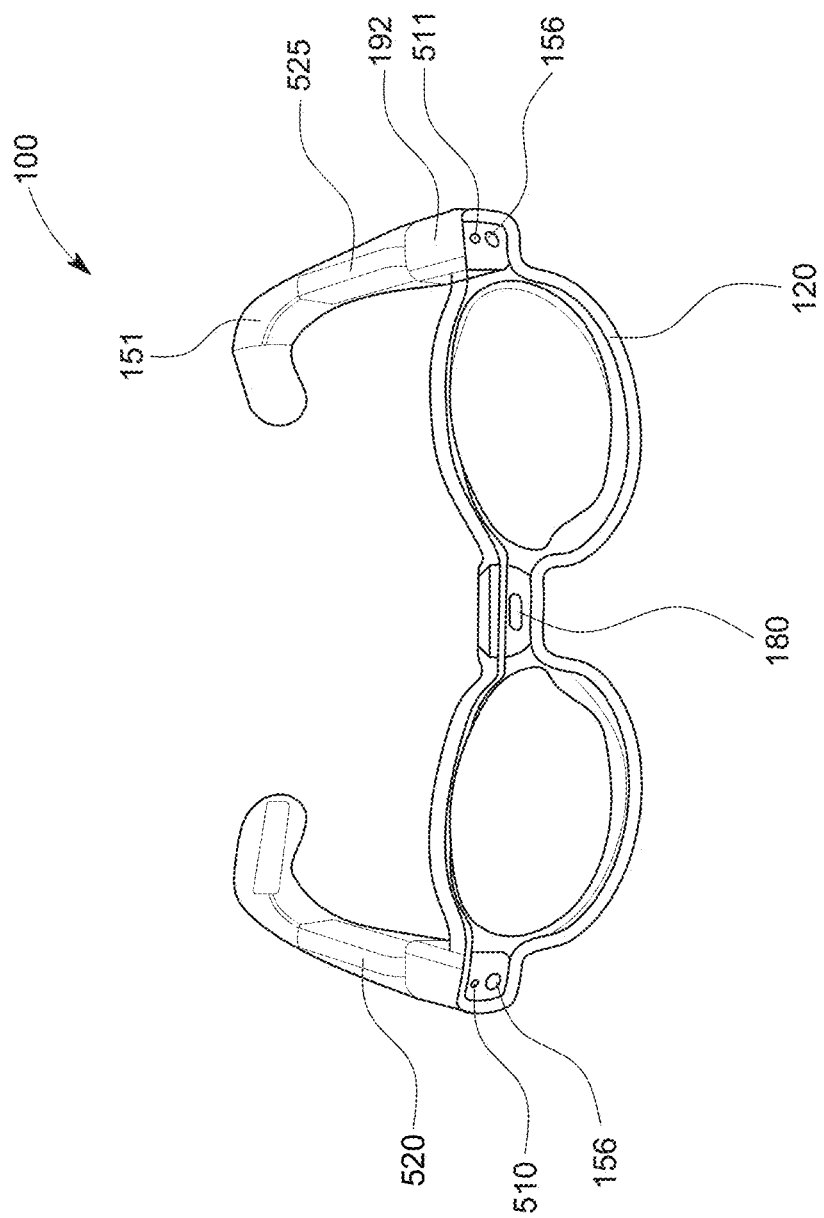
FIG. 5 shows the AR digital glasses with recording protection in the AR mode state, according to some embodiments.

FIG. 5 shows the AR digital glasses 100 with recording protection in the AR mode state, according to some embodiments. As shown, ECD film of the AR digital glasses 100 appears transparent (looks like ordinary glass), which provides the cameras (center camera 155, left and right front cameras 156, left and right side cameras 157) and other sensors to be seen through the AR digital glasses 100. In the AR mode state, the lighting 510 and 511 (e.g., LED, etc.), left and right front cameras 156, and center camera 155 through the center camera housing 180, along with the internal housings 520 and 525 of the respective left and right frame arms 150 and earpieces 151 are visible to alert anyone nearby that a camera may be recording them.

Figure 6:
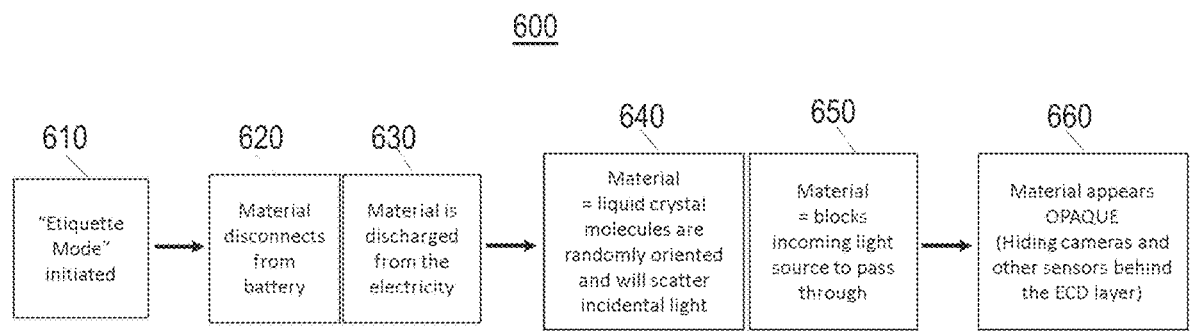
FIG. 6 shows a block flow diagram for an etiquette mode state for the AR digital glasses with recording protection, according to some embodiments.

FIG. 6 shows a block flow diagram 600 for an etiquette mode state for the AR digital glasses 100 (FIG. 1) with recording protection, according to some embodiments. In one or more embodiments, in the etiquette mode state the AR digital glasses 100 automatically (or manually selected the user) turns the ECD film (the ECD film cover 110, and ECD film placed along the internal portions of the frame arms 150 and earpieces 151) from transparent to opaque to block the cameras (center camera 155, left and right front cameras 156, left and right side cameras 157) in conjunction with stopping the AR functionality and/or camera functionality not being used. This makes the wearable frame 120 look like normal eye/sunglasses and thus maximizes the amount of social acceptability by others in the public space or in close proximity to the wearer. The ECD film in the etiquette mode state creates physical occlusion between the built-in cameras (center camera 155, left and right front cameras 156, left and right side cameras 157) and the environment and it helps users to build trust in the technology; and then next into acceptance. Having only LED indicators ON while a camera is operating does not guarantee the true state and may raise privacy concerns. For example, some AR glasses have been banned from many places because the built-in camera raised privacy and piracy concerns (e.g., the sound of the camera shutter on cell phones with built-in cameras cannot be muted in Korea by law, but there are a lot of apps available which disable the sound, an LED record indicator may be disabled, failed, painted, etc.).

In some embodiments, in block 610 the etiquette mode state is initiated (e.g., based on sensed presence, a received signal, a beacon, geolocation, GPS determined location, etc.). In block 620 the ECD film (the ECD film cover 110, and ECD film placed along the internal portions of the frame arms 150 and earpieces 151) disconnects from the battery 170 (FIG. 1). In block 630 the electricity from the ECD film is discharged. In block 640 the ECD film liquid crystal molecules are randomly oriented and scatter the incidental light. In block 650 the ECD film blocks incoming light sources from passing through the ECD film. In block 660, the ECD film appears opaque, which hides the cameras, sensors and other components behind the ECD layer.

Figure 7:
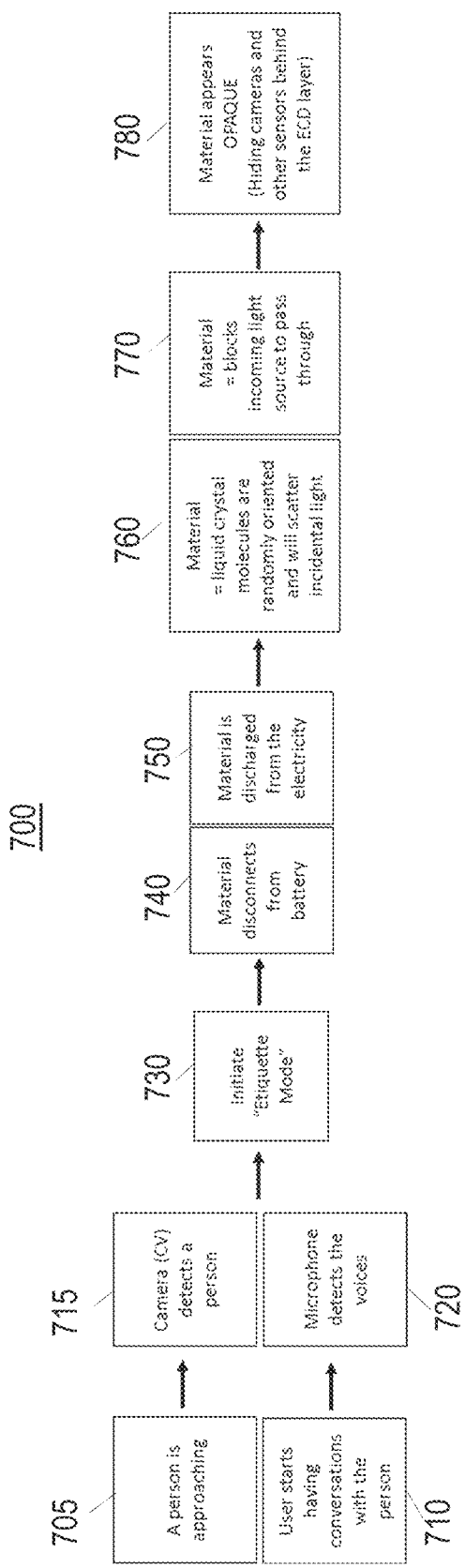
FIG. 7 shows a block flow diagram for the etiquette mode state for the AR digital glasses with recording protection during a conversation with another person present, according to some embodiments.

FIG. 7 shows a block flow diagram 700 for the etiquette mode state for the AR digital glasses 100 (FIG. 1) with recording protection during a conversation with another person present, according to some embodiments. In one or more embodiments, the AR digital glasses 100 automatically turns the ECD film (the ECD film cover 110, and ECD film placed along the internal portions of the frame arms 150 and earpieces 151) opaque (hiding the cameras (center camera 155, left and right front cameras 156, left and right side cameras 157) behind) while having a conversation with other people to inform or show them that the cameras are not recording as they are physically blocked. This will stop the AR functionality as well (e.g., from the display engine 160), once again striving to achieve maximum public trust and acceptance.

In some embodiments, in block 705 a person is approaching the wearer (within the field of view of a camera (e.g., center camera 155, left and right front cameras 156, left and right side cameras 157, FIG. 1)) of the AR digital glasses 100. In block 710, the person that approached starts having conversations with the wearer (outside the field of view of a camera (e.g., center camera 155, left and right front cameras 156, left and right side cameras 157, FIG. 1)) of the AR digital glasses 100. In block 715 one of the cameras (e.g., center camera 155, left and right front cameras 156, left and right side cameras 157, FIG. 1) detects a person (e.g., using one or more motion sensors, computer vision techniques (computer vision is a field of artificial intelligence (AI) enabling computers and systems to derive meaningful information from digital images, videos and other visual inputs, and take actions or make recommendations based on that information, facial recognition, object recognition, etc.), and in block 720 a microphone receives audio sound and the AR digital glasses 100 detects voices from the received audio sound. In block 730 the etiquette mode state is initialized. In block 740 the ECD film (the ECD film cover 110, and ECD film placed along the internal portions of the frame arms 150 and earpieces 151) disconnects from the battery 170, and the ECD film discharges from the electricity being removed in block 750. In block 760 the ECD film liquid crystal molecules are randomly oriented and scatters incidental light. In block 770, the ECD film blocks incoming light sources from passing through the ECD film. In block 780, the ECD material appears opaque, which hides the cameras and other sensors behind the ECD layer of the AR digital glasses 100.

Figure 8:
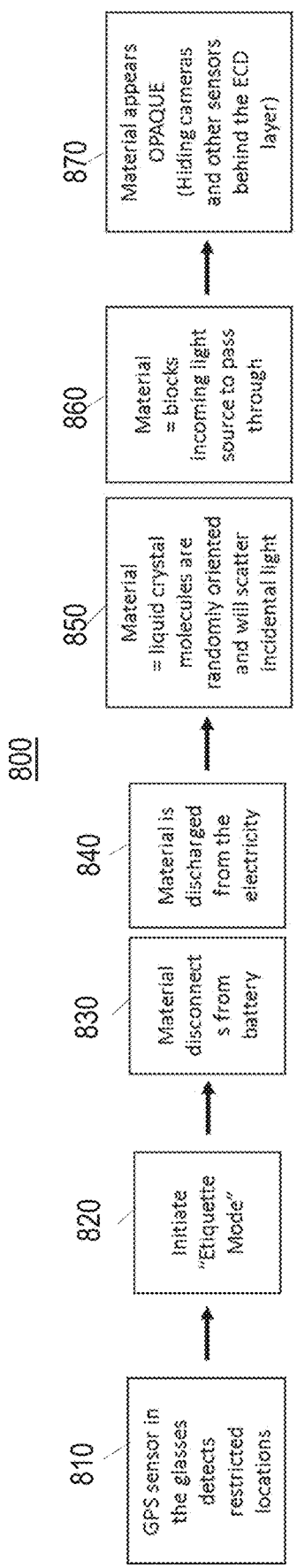
FIG. 8 shows a block flow diagram for the etiquette mode state for the AR digital glasses with recording protection when worn in public, according to some embodiments.

FIG. 8 shows a block flow diagram 800 for the etiquette mode state for the AR digital glasses 100 (FIG. 1) with recording protection when worn in public, according to some embodiments. In one or more embodiments, in the etiquette mode state in restricted public or private spaces (e.g., GPS based, latitude/longitude is known as a do-not-record (DNR) zone, etc.), the AR digital glasses 100 automatically turn the ECD film (the ECD film cover 110, and ECD film placed along the internal portions of the frame arms 150 and ear pieces 151) from transparent to opaque to block the cameras (e.g., center camera 155, left and right front cameras 156, left and right side cameras 157, FIG. 1) wherever recordings are strictly not allowed (e.g., government offices, office buildings, public buildings, movie theatres, banks/ATMs, restrooms, dressing rooms, hospitals, casinos, airport security, entertainment events, etc.).

In some embodiments, in block 810 a GPS sensor/receiver of the AR digital glasses 100 (FIG. 1) detects locations that are determined to be restricted (e.g., comparing current location with a known restricted location list, etc.). In block 820, etiquette mode state is initiated by the AR digital glasses 100. In block 830 the ECD film disconnects from the battery 170. In block 840, the ECD film is discharged of electricity. In block 850, the liquid crystal molecules of the ECD film are randomly oriented and will scatter incidental light. In block 860, the ECD film material blocks incoming light sources from passing through the ECD film. In block 870, the ECD film material appears opaque, which hides the cameras (e.g., center camera 155, left and right front cameras 156, left and right side cameras 157, FIG. 1) and other sensors and components behind the opaque ECD film.

Figure 9:
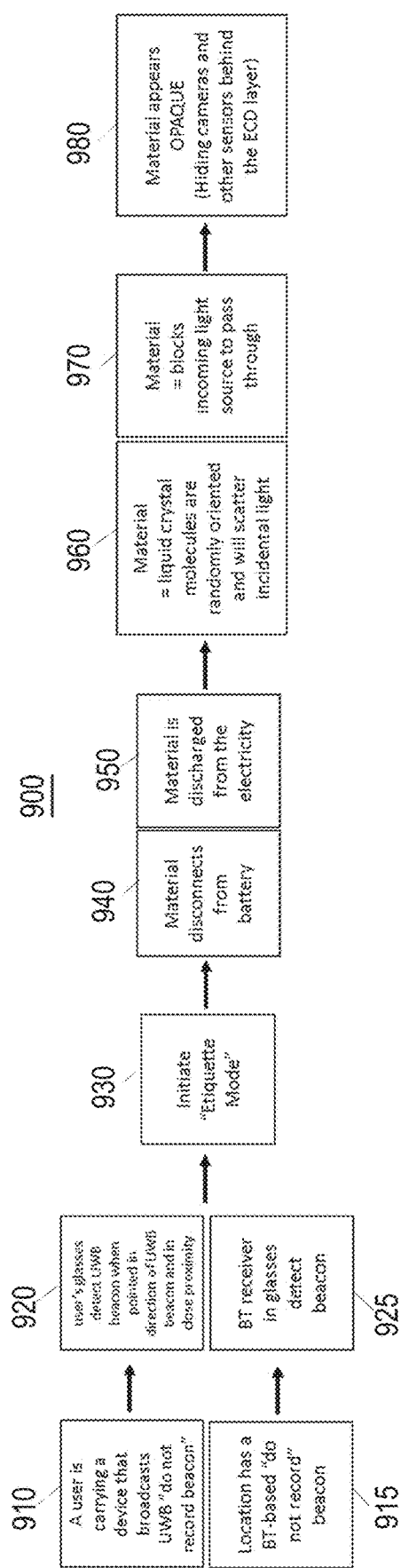
FIG. 9 shows a block flow diagram for the etiquette mode state for the AR digital glasses with recording protection when in proximity of a do-not-record signal or beacon, according to some embodiments.

FIG. 9 shows a block flow diagram 900 for the etiquette mode state for the AR digital glasses 100 (FIG. 1) with recording protection when in proximity of a DNR signal or beacon, according to some embodiments. In one or more embodiments, for the etiquette mode state via a "personal do-not-record beacon" (e.g., ultra-wideband or BLUETOOTH° (UWB/BT) based), the AR digital glasses 100 automatically turns the ECD film (the ECD film cover 110, and ECD film placed along the internal portions of the frame arms 150 and ear pieces 151) opaque (hiding the cameras (e.g., center camera 155, left and right front cameras 156, left and right side cameras 157, FIG. 1) and other sensors and components behind). In this etiquette mode state situation, the AR digital glasses 100 detected a "do-not-record" beacon in close proximity—either placed in a sensitive location (e.g., bathroom, etc.) and broadcasting to cover a larger geographical area/location or when another user is wearing such a device that broadcasts their desire to not being recorded, acting as a personal digital cloak.

In some embodiments, in block 910 a user is carrying a device that broadcasts UWB "do not record beacon" or in block 915 a location has a BLUETOOTH° based "do not record" beacon. In block 920 the AR digital glasses 100 detects a UWB beacon when pointed in the direction of the UWB beacon when in close proximity, or in block 925 a BLUETOOTH° receiver or transceiver in the AR digital glasses 100 detects a location-based beacon. In block 930, the etiquette mode state is initialized. In block 940 the ECD film disconnects from the battery 170. In block 950, the ECD film is discharged of electricity. In block 960, the liquid crystal molecules of the ECD film are randomly oriented and will scatter incidental light. In block 970, the ECD film material blocks incoming light sources from passing through the ECD film. In block 980, the ECD film material appears opaque, which hides the cameras (e.g., center camera 155, left and right front cameras 156, left and right side cameras 157, FIG. 1) and other sensors and components behind the opaque ECD film.

Figure 10:
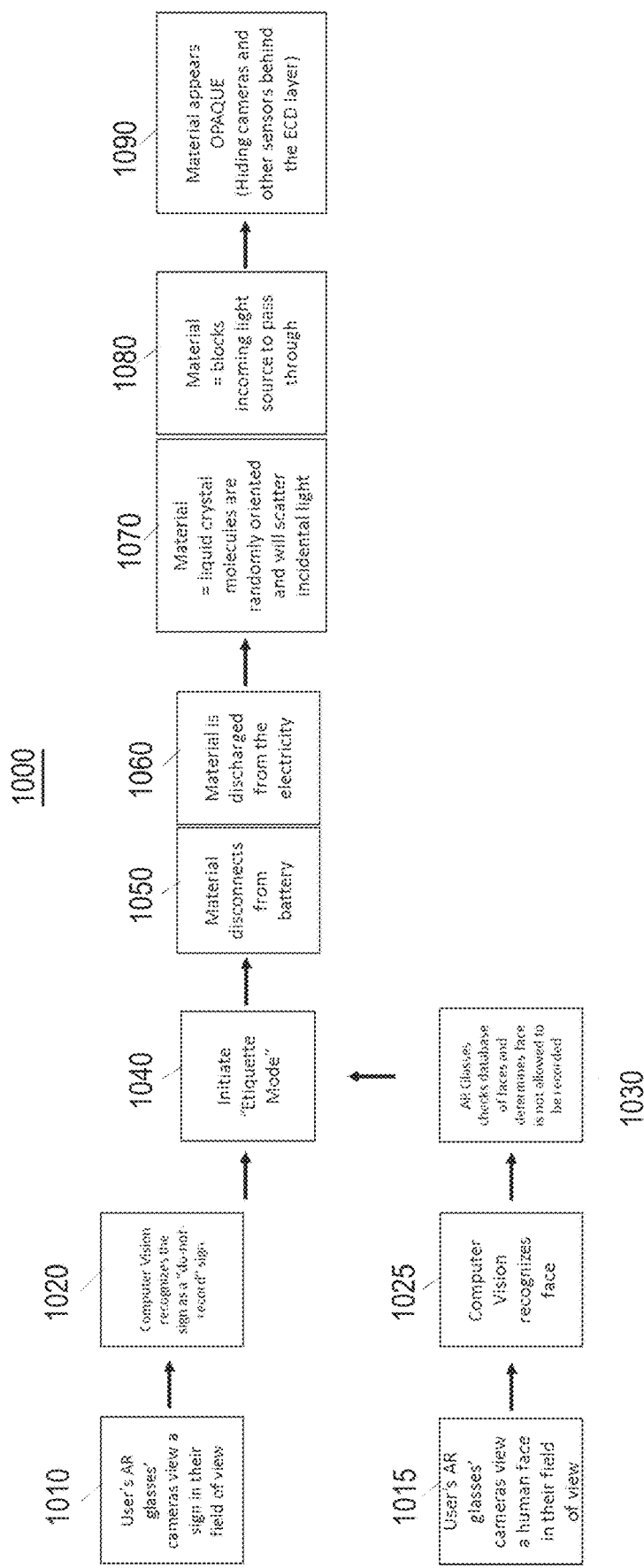
FIG. 10 shows a block flow diagram for the etiquette mode state for the AR digital glasses with recording protection when in proximity of a sign indicating that privacy may be warranted, according to some embodiments.

FIG. 10 shows a block flow diagram 1000 for the etiquette mode state for the AR digital glasses 100 (FIG. 1) with recording protection when in proximity of a physical sign indicating that privacy may be warranted, according to some embodiments. In one or more embodiments, for the etiquette mode state via computer vision and object recognition (e.g., AI), the AR digital glasses 100 automatically turn the ECD film (the ECD film cover 110, and ECD film placed along the internal portions of the frame arms 150 and ear pieces 151) opaque (hiding the cameras (e.g., center camera 155, left and right front cameras 156, left and right side cameras 157, FIG. 1) and other sensors and components behind, while having detected a sign in the field of view of at least one of the cameras that would warrant a level of privacy (e.g., a washroom sign, "no cameras allowed" sign, etc.). Additionally, computer vision allows for facial recognition, so if people do not want to be tracked, a central database is queried to determine if a user has opted out from being recorded. When either of these events are detected, a temporal geo-fence may be established around the user in which recording by the AR digital glasses 100 is prohibited.

In some embodiments, in block 1010 the AR digital glasses 100 view a sign in the field of view. In block 1020 computer vision technology is employed that recognizes the sign as a "do-not-record" sign. Alternatively, in block 1015 the AR digital glasses 100 detects a human face in one of the cameras field of view. In block 1025 computer vision technology is employed to recognize the human face. In block 1030, the AR digital glasses 100 queries a database of faces and determines that the detected face is listed as not allowed to be recorded. After 1020 or 1025, the flow diagram 1000 proceeds to block 1040 where the etiquette mode state is initialized. In block 1050 the ECD film disconnects from the battery 170. In block 1060, the ECD film is discharged of electricity. In block 1070, the liquid crystal molecules of the ECD film are randomly oriented and will scatter incidental light. In block 1080, the ECD film material blocks incoming light sources from passing through the ECD film. In block 1090, the ECD film material appears opaque, which hides the cameras (e.g., center camera 155, left and right front cameras 156, left and right side cameras 157, FIG. 1) and other sensors and components behind the opaque ECD film.

Figure 11A:
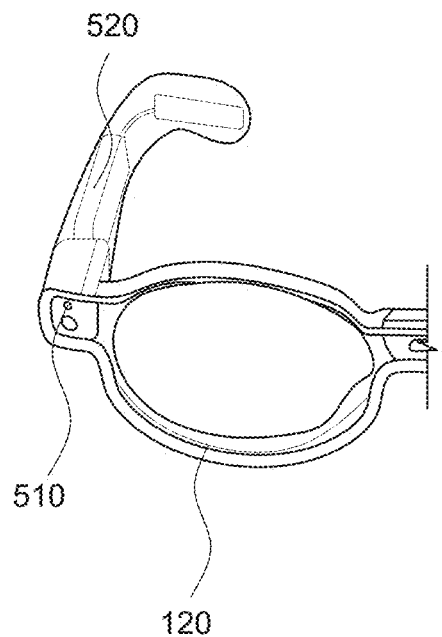
FIGS. 11A-B shows different mode states of the AR digital glasses with recording protection for the AR mode state (FIG. 11A) with an arm opened, and when in a privacy mode state with an arm closed (FIG. 11B; AR mode state is off), according to some embodiments.
Figure 11B:
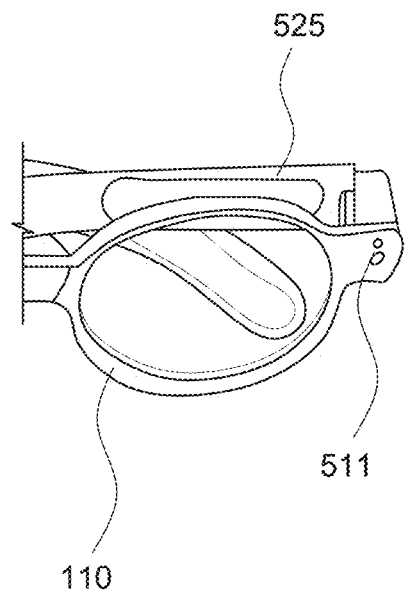

FIGS. 11A-B show different mode states of the AR digital glasses 100 (FIG. 1) with recording protection for the AR mode state (FIG. 11A) with the right frame arm 150 with earpiece 151 opened, and when in a privacy mode state (FIG. 11B) with the left frame arm 150 with earpiece 151 closed (AR mode state is off), according to some embodiments. As shown, the right frame arm 150 with earpiece 151 is in the AR mode state with the lighting 510 indication lit, while the left frame arm 150 with earpiece 151 is in the privacy mode state with the lighting 510 indication blocked by the opaque appearance of the ECD film (the ECD film cover 110, and ECD film placed along the internal portions of the frame arm 150 and earpiece 151).

Figure 12:
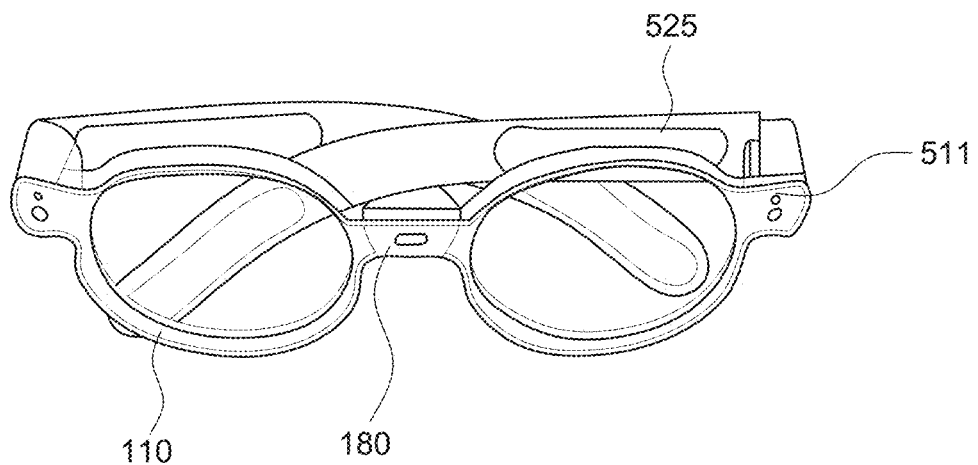
FIG. 12 shows the AR digital glasses with recording protection with both frame arms folded for the privacy mode state (AR mode state is off), according to some embodiments.

FIG. 12 shows the AR digital glasses 100 (FIG. 1) with recording protection with both frame arms (frame arms 150 with earpieces 151) folded for the privacy mode state (AR mode state is off), according to some embodiments. By folding the frame arms, the ECD film (the ECD film cover 110, and ECD film placed along the internal portions of the frame arms 150 and earpieces 151) is automatically transitioned from transparent to opaque to block camera (e.g., center camera 155, left and right front cameras 156, left and right side cameras 157, FIG. 1) and other sensors and components behind the opaque ECD film.

Figure 13:
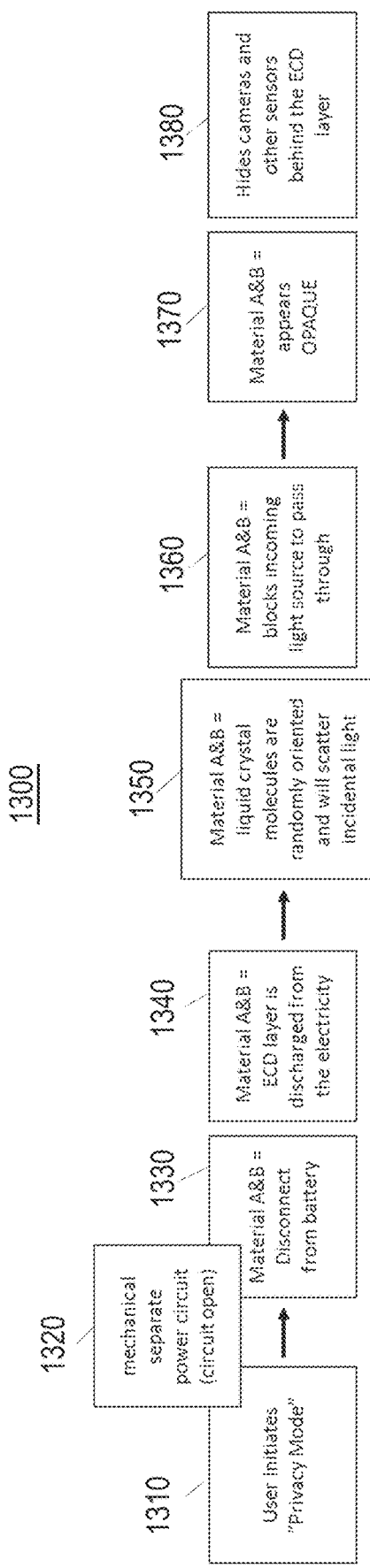
FIG. 13 shows a block flow diagram for the privacy mode state (AR mode state off) for the AR digital glasses with recording protection, according to some embodiments.

FIG. 13 shows a block flow diagram 1300 for the privacy mode state (AR mode state off) for the AR digital glasses 100 (FIG. 1) with recording protection, according to some embodiments. In one or more embodiments, by folding the frame arms (frame arms 150 with ear pieces 151) of the AR digital glasses 100, the ECD film (the ECD film cover 110, and ECD film placed along the internal portions of the frame arms 150 and ear pieces 151) is automatically transitioned from transparent to opaque to block camera (e.g., center camera 155, left and right front cameras 156, left and right side cameras 157, FIG. 1) and other sensors and components behind the opaque ECD film.

In some embodiments, in block 1310 a user initiates the privacy mode state for the AR digital glasses 100 by folding the frame arms. In block 1320, the AR digital glasses 100 mechanically separate the power circuit (i.e., open circuit) by folding the frame arms. In block 1330 the ECD film material disconnects from the battery 170. In block 1340, the ECD film is discharged of electricity. In block 1350, the liquid crystal molecules of the ECD film are randomly oriented and will scatter incidental light. In block 1360, the ECD film material blocks incoming light sources from passing through the ECD film. In block 1370, the ECD film material appears opaque, which in block 1380 hides the cameras (e.g., center camera 155, left and right front cameras 156, left and right side cameras 157, FIG. 1) and other sensors and components behind the opaque ECD film.

Figure 14:
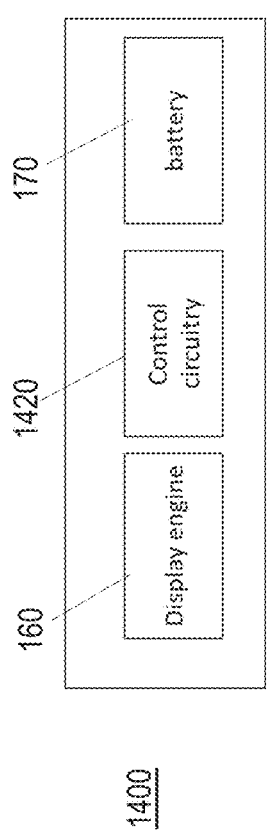
FIG. 14 shows a block diagram of internal components of the AR digital glasses with recording protection, according to some embodiments.

FIG. 14 shows a block diagram 1400 of internal components of the AR digital glasses 100 with recording protection, according to some embodiments. The internal components include the battery 170, the display engine 160 (e.g., a graphical processing unit (GPU), memory, processor(s), mode state processing, communication processing (e.g., for communication with other smart device(s), BLUETOOTH® receiver/transceiver, etc.), etc.

Figure 15:
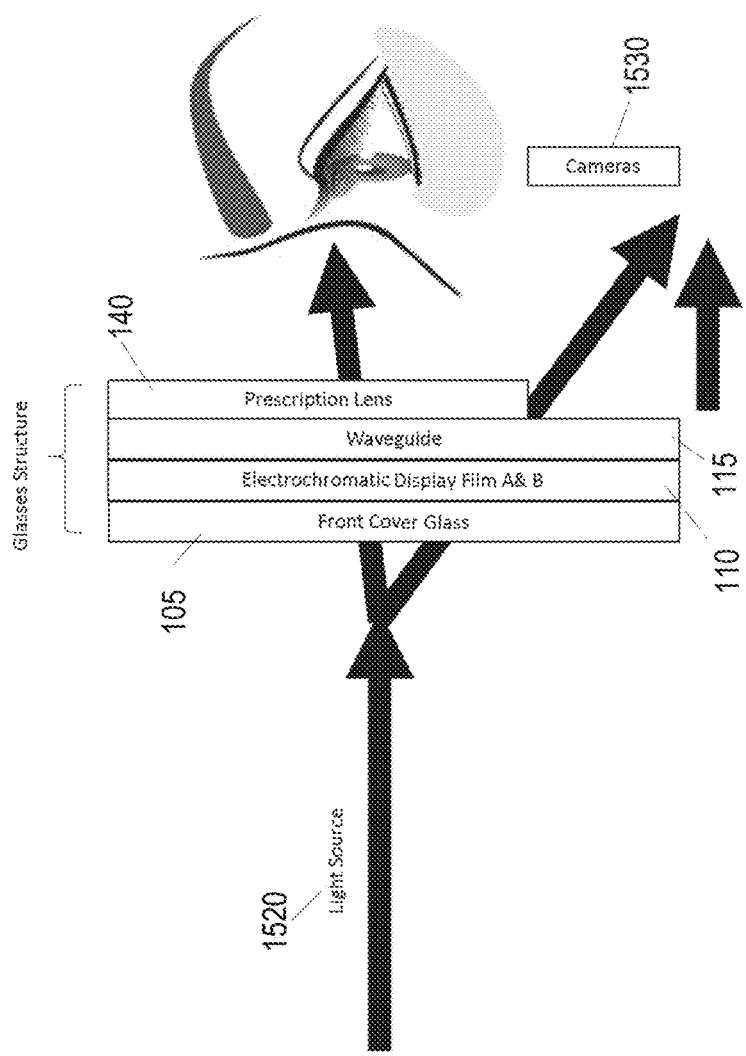
FIG. 15 shows the path light takes into the front of the AR digital glasses with recording protection, according to some embodiments.

FIG. 15 shows the path light takes into the front of the AR digital glasses 100 (FIG. 1) with recording protection, according to some embodiments. The path the light source (natural or artificial) 1520 takes into the front of the AR digital glasses 100 will follow a path in order to allow the user to see through the AR digital glasses 100, with the prescription lens 140 layer as optional. Light will also follow path to the front-facing cameras 1530 (e.g., center camera 155, left and right front cameras 156) to operate, however this path of light will omit the prescription lens 140 layer as this is not required by the cameras. Additionally, this light source 1520 path is forced through the ECD film 110 layer to ensure a physical layer of security of preventing the front cameras 1530 of properly receiving the light required to record. This is the embedded physical layer of security.

Figure 16:
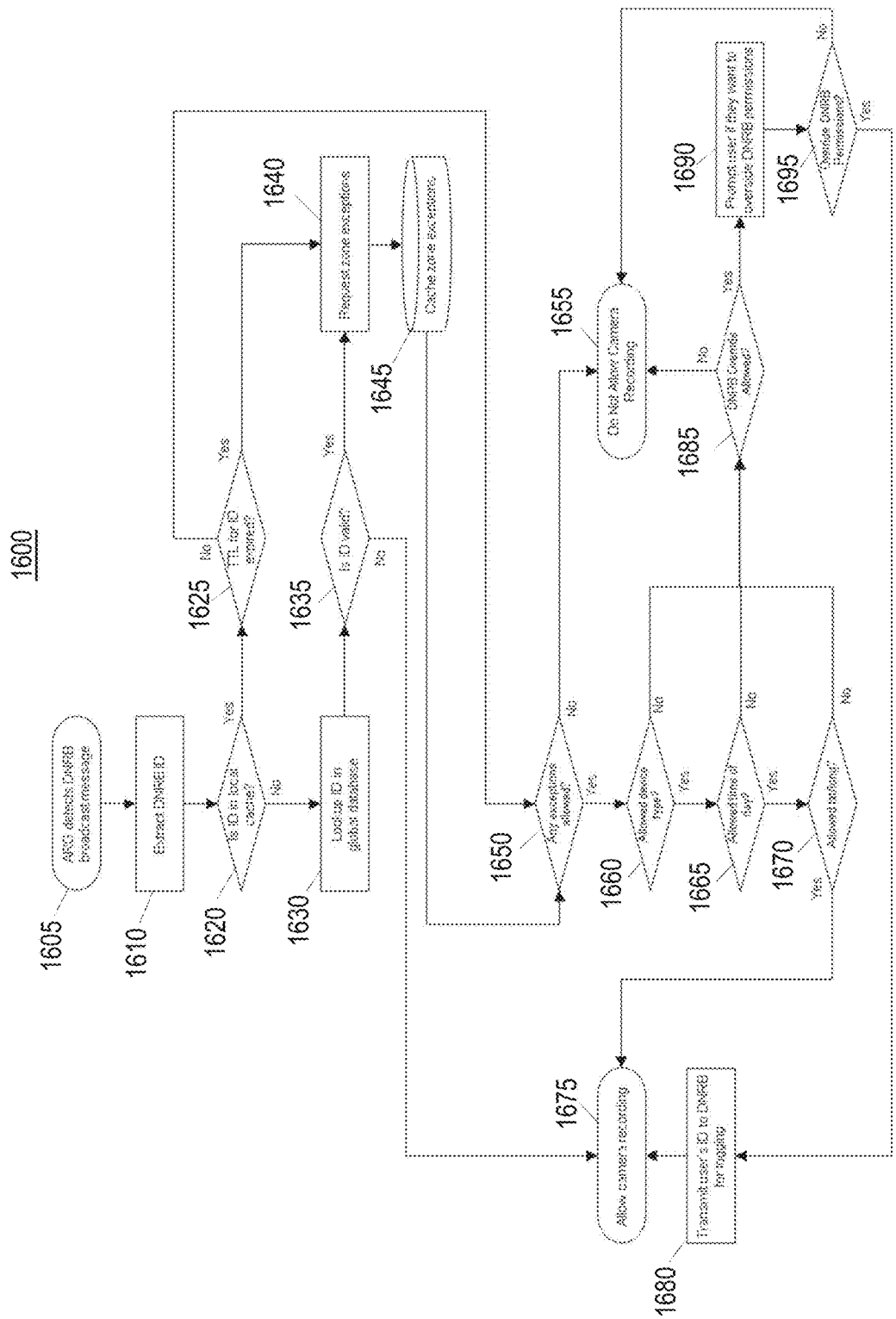
FIG. 16 shows a flow diagram for a do-not-record (DNR) geographical signal or beacon being present for the AR digital glasses with recording protection, according to some embodiments.

FIG. 16 shows a flow diagram 1600 for a DNR geographical signal or beacon being present for the AR digital glasses 100 (FIG. 1) with recording protection, according to some embodiments. On one or more embodiments, using BLUETOOTH®, UWB or similar short-range technologies, a beacon may be placed in a location requiring privacy. The beacon will initiate a handshake with any nearby electronic devices stating the privacy level required in the zone that is blanketed by radio frequency (RF). This handshake will: a) verify the authenticity of the beacon, b) stipulate the conditions of the privacy zone (time, geography, device type, etc.) and c) if a user-selected override is allowed. If the user-selectable override is possible, the user's electronic device identification (ID) and other unique identifiers may be logged by the beacon for security purposes. A global database, accessible via the Internet, contains the complete record of all DNR beacon (DNRB) locations and unique IDs. For enterprise/private use, a local database may be queue.

In some embodiments, in block 1605 the AR digital glasses 100 detects a DNRB broadcast message. In block 1610 the DNRB ID is extracted from the broadcast message. In block 1620 it is determined whether the DNRB ID is found in local cache memory 1645 of the AR digital glasses 100 or not (e.g., recently been here already). If the DNRB ID is found in the local cache memory 1645 of the AR digital glasses 100, the flow proceeds to block 1625 where it is determined whether a time to live (TTL) for the DNRB ID has expired or not. If it is determined that the TTL for the DNRB ID is expired, the flow proceeds to block 1640, otherwise the flow proceeds to block 1650. If it is determined that the DNRB ID is not in the local cache memory 1645, the flow proceeds to block 1630. In block 1630 the AR digital glasses 100 performs a lookup process for the DNRB ID in a global database. The flow then proceeds to block 1635.

In some embodiments, in block 1635 it is determined whether the DNRB ID is valid or not. If it is determined that the DNRB ID is not valid, the flow proceeds to block 1675, otherwise the flow proceeds to block 1640. In block 1640 the AR digital glasses 100 requests zone exceptions for the DNR area and stores the zone exceptions into the local cache memory 1645. In block 1675 the cameras (e.g., center camera 155, left and right front cameras 156, left and right side cameras 157, FIG. 1) of the AR digital glasses 100 are unblocked by the ECD film (the ECD film cover 110, and ECD film placed along the internal portions of the frame arms 150 and earpieces 151) being connected to the battery 170.

In one or more embodiments, in block 1650 it is determined whether any exceptions (e.g., exceptions provided by the DNRB administrator for certain situations, events, portions of a zone, etc.) are allowed. If there are no exceptions that are allowed, the flow 1600 proceeds to block 1655 where the cameras of the AR digital glasses 100 are not allowed to record by disconnecting the battery 170 to the ECD film. If it is determined in block 1650 that exceptions are allowed for the zone, in block 1660 it is determined which electronic device types are allowed to record. If it is determined that the electronic device is not allowed to record, the flow 1600 proceeds to block 1685. In block 1685 it is determined whether a DNRB override (e.g., certain users may be provided an override, such as an event promotor, a news organization, security, etc.) is allowed or not. If no overrides are permitted, the flow proceeds to block 1655 where the cameras are not allowed to record by removing the battery 170 from the ECD film, which turns the ECD film opaque.

In some embodiments, if block 1660 determines that the AR digital glasses 100 is an allowed device type, the flow 1600 proceeds to block 1665. In block 1665 it is determined whether the current time of day is allowed for recording by the cameras of the AR digital glasses 100. If the current time is not allowed recording by the cameras of the AR digital glasses 100, the flow 1600 proceeds to block 1685. If it is determined in block 1685 that a DNRB override is allowed, then in block 1690 the user is prompted whether they want to override the DNRB permissions or not. In block 1695 if it is determined that the DNRB override is not desired by the user, then the flow 1600 proceeds to block 1655 and the cameras are not allowed to record by removing the battery 170 from the ECD film. If it is determined that the user does want to override the DNRB permissions, then the flow 1600 proceeds to block 1680 where the user's electronic device ID is transmitted or communicated to the DNRB database for logging and the cameras are allowed to record in block 1675.

In one or more embodiments, if it is determined in block 1665 that the current time of day is permitted to record by the AR digital glasses 100, then the flow 1600 proceeds to block 1670. In block 1670 it is determined whether the current position (latitude/longitude, event location, etc.) is allowed or permitted to record by the cameras, the flow 1600 proceeds to block 1675 and the cameras of the AR digital glasses 100 are allowed to record and the ECD film is connected to the battery making the ECD film transparent. Otherwise, if in block 1670 it is determined that the location is not permitted to be recorded, the flow 1600 proceeds to block 1685.

FIG. 17A shows a flow diagram 1700 for a DNR personal signal or beacon being present for the AR digital glasses 100 (FIG. 1) with recording protection, according to some embodiments. FIG. 17B shows a table for different scenarios 1780, the state 1785 and description 1790 for the flow diagram 1700 in FIG. 17A, according to some embodiments. In one or more embodiments, the flow diagram 1700 relates to use of a personal beacon and digital cloaking. Using UWB or similar directional/vector based short-range technologies, an electronic device on or with a user may signal to other electronic devices its intention for the scenarios 1780 to, a) fully open interaction where permission to be recorded is granted and identified, b) open interaction with face blurring where permission to be recorded and identified is granted, but only if their face is blurred or concealed, c) reveal identity, but do not record where the user is not to be recorded but permission is granted to be identified, d) reveal alias and allow recording where the user is identified using an alias/handle/virtual ID and permission is granted to be recorded, e) reveal alias with face blurring where the user is identified using alias/handle/virtual ID and permission is granted for the user to be recorded, but only if their face is blurred, f) reveal alias but do not record where permission is denied for recording but granted to be identified using alias/handle/virtual ID or g) fully blocked where no digital interaction is permitted. In some embodiments, in a public arena, the permissions would be implemented using the vector mechanics of the vector-based RF technology—so the direction and length of the vector would be taken into account when implementing the cloaking protocol. That is, the distance away to the other person and the direction of that person would indicate when to apply the digital cloak. The AR digital glasses 100 are uniquely always pointing in the direction that the user is looking at, thus the RF vector calculation is always correctly oriented without any additional calibration or inference of which direction is forward within the user experience. For face blurring to occur, the computer vision and face recognition engine of the display engine 160 (FIG. 1) on the AR digital glasses 100 must be able to successfully locate and identify the face of the person to be blurred.

Returning to FIG. 17A, in one or more embodiments, in block 1705 the AR digital glasses 100 detects a DNRB broadcast message. In block 1710 the AR digital glasses 100 evaluates distance and direction of the sender of the DNRB broadcast message. In block 1715, the AR digital glasses 100 downloads the DNRB permissions. In block 1720 it is determined if the DNRB message includes permissions for fully blocked (scenario G, FIG. 17B). If it is determined that the DNRB message includes permissions for fully blocked, the flow 1700 proceeds to block 1745 and the cameras (e.g., center camera 155, left and right front cameras 156, left and right side cameras 157, FIG. 1) are not permitted to record in the direction of the DNRB. Otherwise, in block 1725 the electronic device ID is stored in memory of the AR digital glasses 100. In block 1730 it is determined whether the DNBR message permits sharing of an alias ID. If it is determined that the DNBR message does not permit sharing of an alias ID, the flow 1700 proceeds to block 1740 and stores the user ID in memory of the AR digital glasses 100 (for scenarios A, B and C, FIG. 17B) and proceeds to block 1750. Otherwise, the flow 1700 proceeds to block 1735 and stores the user ID in memory of the AR digital glasses 100 (for scenarios D, E and F, FIG. 17B) and proceeds to block 1750.

In some embodiments, in block 1750 it is determined whether the DNBR message requires blurring of a face. If the DNBR message does not require blurring of a face, the flow 1700 proceeds to block 1775 where it is determined whether the DNBR message permits recording of a person's face. If it is determined that the DNBR message does not permit recording of a person's face (for scenarios C and F, FIG. 17B), the flow 1700 proceeds to block 1745. If it is determined that the DNBR permits blurring a person's face in block 1750, then the flow 1700 proceeds to block 1755 and the AR digital glasses 100 records the camera viewed footage and proceeds to block 1760. In block 1760, computer vision technology is used to apply the face blurring effect and in block 1765 the recorded footage is stored in memory of the AR digital glasses 100. If in block 1775 it is determined that the DNBR message permits recording of a person's face, the flow 1700 proceeds to block 1770. In block 1770, the AR digital glasses 100 records the camera viewed footage and proceeds to block 1765 and the recorded footage is stored in memory of the AR digital glasses 100.

In some embodiments, in any environment where DNR beacons are enforced for a geography and/or an individual, the AR digital glasses 100 interface is able to display those zones in three-dimensional (3D) space while the user is wearing the AR digital glasses 100 (FIG. 1)—in order to assist the user to avoid those areas if they choose to. Similarly, there is a visual indicator inserted or overlayed over the user or the user's face to show they do not want to be recorded when they are in the field of view of the cameras (e.g., center camera 155, left and right front cameras 156, left and right side cameras 157, FIG. 1) of the AR digital glasses 100.

FIGS. 18A-B show an example of signal or beacon zones used for multiple DNR zones or for zones where recording is allowed for persons present in view of the AR digital glasses 100 (FIG. 1) that have recording protection, according to some embodiments. In FIG. 18A, people 1805 have DNR zone permissions shown from top view and the person 1820 has record permission for the AR digital glasses 100 worn by person 1810. In one or more embodiments, when the DNRB message is detected, the person 1810 is notified visually or through text on a user interface (UI) to not record in a zone, for object or for people. FIG. 18B shows an isometric view of a person 1805 shown with a DNR zone around them formed when the person 1810 is wearing the AR digital glasses 100 and received the DNRB message with DNR permission. In some embodiments, the AR digital glasses 100 includes an interface representation of the DNR that is triggered based on various data points from the etiquette mode state. In a live view, the user is provided a display including a live marker (visual or text notification) overlaying or around the DNR object or zone. If the user of the AR digital glasses 100 still chooses to record, then the resulting media (e.g., video, image, 3D media, etc.) visually blocks the DNRB zone/object. When the DNRB message is detected, user gets notified visually or text interface to not record a certain zone/object. This Interface representation of the DNR is triggered when computer vision processing detects a DNR zone/object.

FIGS. 19A-B shows an example of a DNR signal or beacon zone 1910 for a building or structure in view of the AR digital glasses 100 with recording protection (as worn by the user 1810), according to some embodiments. FIG. 19A shows a top view of the user 1810, zones and the DNR signal or beacon zone 1910. FIG. 19B shows a live view where the user 1810 sees a live marker shown, for example, as an outline (or text notification) overlaying or around the DNR object or beacon zone 1910. If the user 1810 still chooses to record, then the resulting media (video or image) will visually block the DNRB object or beacon zone 1910.

Figure 20A:
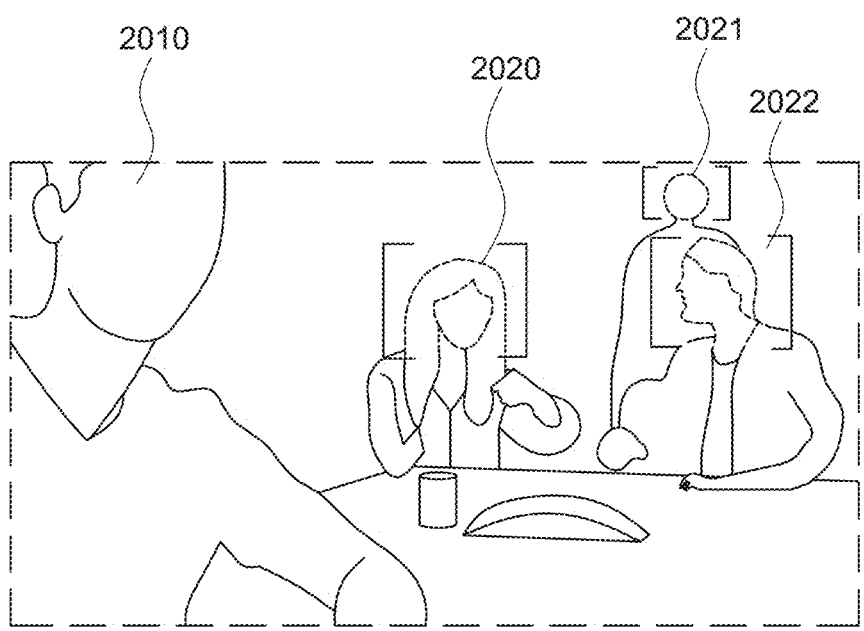
FIG. 20A shows an example of full pixilation filter and partial visual blocking filter for the AR digital glasses with recording protection, according to some embodiments.

FIG. 20A shows an example of full pixilation filter and partial visual blocking filter for the AR digital glasses 100 (FIG. 1) with recording protection, according to some embodiments. In the illustrated example, the person 2010 in the live view image displayed on the AR digital glasses 100 has permissions to record or no DNRB message, and therefore is displayed without blurring. The other persons have a DNRB message indicating blurring permissions and are shown with blurred faces with brackets (or focus brackets) 2020, 2021 and 2022. In some embodiments, the user interface considerations may be employed as follows. When a DNR beacon, signal or indication is detected on a person/human/pet, a visual blocking occurs in the final output of the recording (providing a user of the AR digital glasses 100 continued with recording). These visual blocking indications may be represented on humans and pets in different ways. The person can choose to block their face or entire body. The person can choose different ways of blocking mechanisms such as blurring, pixilation or overlaying shapes, animations, objects, GIFs, textures, colors and AR shapes/filters to keep their privacy and disguise and obscure any form of visual identification data (e.g., nametags, text on clothing, jewelry, etc.). The amount of obscuring is defined by the authority and the person. For example, no restriction, partial restriction, full restriction. This visual blocking can be seen in live action through the AR digital glasses 100 and can be seen only when recorded output or media is replayed and viewed.

In some embodiments, there is a visual user interface indicator when the AR digital glasses 100 identifies a DNRB message or enters the etiquette mode state. The DNR zone, object or person action is triggered based on defined factors in the etiquette mode state. For example, accuracy of computer vision, geographical location, voices, context, etc. In one or more embodiments, a combination of these results triggers the visual blocking of object/building/person/pet.

Figure 20B:
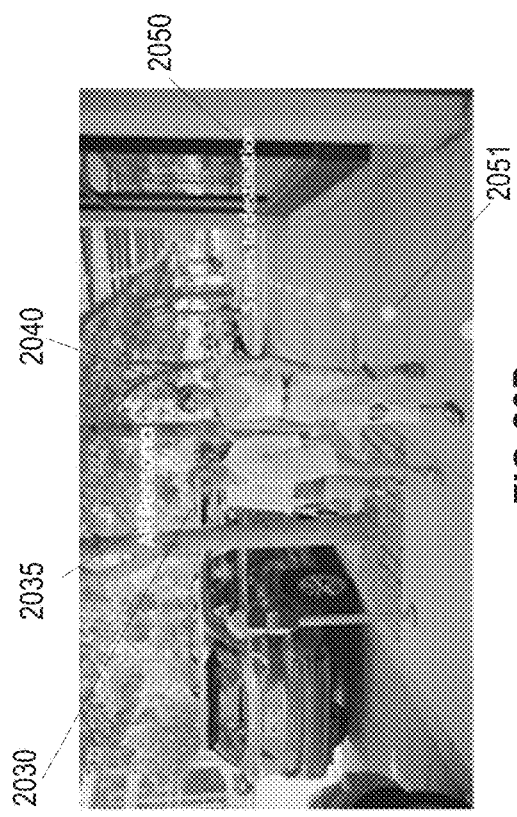
FIG. 20B shows an example of using AR virtual elements for information and for partial disguise of a person from the perspective of the AR digital glasses with recording protection, according to some embodiments.

FIG. 20B shows an example of using AR virtual elements (2035, 2050 and 2051) for information and for partial disguise of a person 2030 from the perspective of the AR digital glasses 100 (FIG. 1) with recording protection, according to some embodiments. In this example embodiment, the person 2030 is obscured with an AR filter for obscuring their face (based on a DNRB message permitting recording but with obscuring). The visual AR virtual element 2035 is viewed over the person 2030 and indicates in text "AR Persona." Additionally, the AR virtual element 2050 shows distance to a destination (e.g., for the wearer of the AR digital glasses 100) and the AR virtual element 2051 shows a virtual pathway to the destination. The person 2040 is permitted to be recorded and is unobscured.

In the world of AR and/or virtual reality (VR) and wearables with cameras, there is a societal aversion towards the fear of being recorded without the knowledge of the non-wearer. This has shown itself to severely hinder the acceptance of existing products and can lead to nomenclature directed to unacceptance of the technology as the result of not being fully transparent to the larger public. Similarly, there is a natural aversion to wanting to wear such technology—that is, wearables must be "lifestyle" devices in order to gain mass market adoption. Thus, the ability to dynamically control the transparency of a physical container will allow development of AR/VR products to appear as normal glasses when the device and camera are not in use—thus appearing as a normal lifestyle product. In some embodiments, when the user is using the AR digital glasses 100 (FIG. 1) and/or using the cameras (center camera 155, left and right front cameras 156, left and right side cameras 157), however, making the glasses transparent reveals the technology within to allow the non-wearers in the surrounding area to understand that there is a technological event occurring—so in form it is a version of full disclosure—which is the first step in having users begin to build trust in the technology and then next into acceptance of the technology. Some embodiments using this technology applies to any wearable computing device (e.g., pendants, body cams, headwear cams, etc.), where public disclosure of the fact that the wearable includes this technology would aid in user adoption of the technology.

Figure 21:
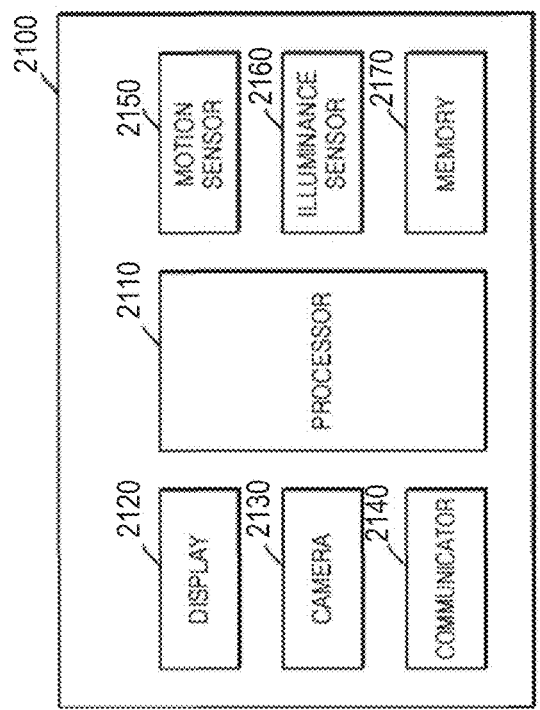
FIG. 21 shows a block diagram of electronic components for the AR digital glasses with recording protection, according to some embodiments.

FIG. 21 shows a block diagram 2100 of electronic components for the AR digital glasses 100 (FIG. 1) with recording protection, according to some embodiments. In one or more embodiments, the AR digital glasses 100 may include a processor 2110, a display 2120, a camera set 2130 (e.g., including (center camera 155, left and right front cameras 156, left and right side cameras 157), a communicator 2140, a motion sensor 2150, an illuminance sensor 2160, and a memory 2170. The processor 2110 may control the display 2120 to display information processed by the AR digital glasses 100. The processor 2110 may, for example, control the display 2120 to display a user interface for controlling the AR digital glasses 100, a user interface for displaying a state of the AR digital glasses 100, etc.

In some embodiments, the processor 2110 may obtain a preview image through the camera set 2130 of the AR digital glasses 100. The processor 2110 may track the direction of a gaze of the user wearing the AR digital glasses 100. The processor 2110 may determine at least one object of interest in a preview image, based on the tracked direction of the gaze. The processor 2110 may, for example, determine an object of interest in the preview image, based on image analysis with respect to a region corresponding to the tracked gaze direction in the preview image. The processor 2110 may obtain local motion information indicating a movement of an object of interest by tracking a movement of the at least one object of interest. The processor 2110 may, for example, track the position change of the object of interest in each frame of the preview image and obtain the local motion information based on a result of tracking the position change.

In one or more embodiments, the processor 2110 may control the motion sensor 2150 to measure a movement of the AR digital glasses 100. The processor 2110 may, for example, control the motion sensor 2150 to measure at least one of a position, a direction, a speed, or an acceleration of the AR digital glasses 100. In some embodiments, the motion sensor 2150 may also include a GPS receiver. The processor 2110 may obtain global motion information indicating motion of a background region included in the preview image, based on the measured movement of the AR digital glasses 100. The processor 2110 may, for example, determine a background region included in the preview image, and track a movement of the background region based on a result of measuring movement of the AR digital glasses 100. The AR digital glasses 100 may obtain the global motion information based on a result of tracking the movement of the AR digital glasses 100.

In one or more embodiments, the processor 2110 may adjust the degree of exposure of a camera in the camera set 2130 capturing the front of the AR digital glasses 100, based on the obtained local motion information or global motion information. The processor 2110 may control the illuminance sensor 2160 to measure an illuminance around the AR digital glasses 100. The processor 2110 may adjust the degree of exposure of a camera in the camera set 2130 capturing a view of the AR digital glasses 100, based on the measured illuminance around the AR digital glasses 100. The processor 2110 may, for example, adjust at least one of an ISO value, a shutter speed, or an aperture value of a camera in the camera set 2130 photographing a view of the AR digital glasses 100 to adjust the degree of exposure of the camera 2130 capturing the view of the AR digital glasses 100.

In some embodiments, the processor 2110 may, for example, identify an illuminance of an object of interest in a preview image. The processor 2110 may determine a shutter speed range by comparing the illuminance around the AR digital glasses 100, measured through the illuminance sensor 2160 with the identified illuminance of the object of interest. The processor 2110 may determine an International Organization of Standardization (ISO) value range based on the determined shutter speed range. The processor 2110 may, for example, identify a depth of an object of interest in the preview image and determine an aperture value range based on the identified depth.

In one or more embodiments, the processor 2110 may generate a control command for adjusting at least one of the ISO value, the shutter speed, or the aperture value of the camera 2130, based on the determined shutter speed range, the determined ISO value range, and the determined aperture value range. The processor 2110 may deliver the generated control command to any of the cameras in the camera set 2130. The processor 2110 may control any camera in the camera set 2130 having the adjusted degree of exposure to photograph the front of the AR digital glasses 100.

In some embodiments, the communicator 2140 may include one or more communication devices or modules for communication with an external device. The communicator 2140 may, for example, include a short-range communicator and a mobile communicator. The short-range communicator may include, but not limited to, a BLUETOOTH® low energy (BLE) communication unit, a near field communication (NFC) unit, a wireless local area network (WLAN) (Wi-Fi) communication unit, a ZIGBEE° communication unit, an infrared Data Association (IrDA) communication unit, a Wi-Fi Direct (WFD) communication unit, an ultra-wideband (UWB) communication unit, an ANT+® communication unit, etc. The mobile communicator may transmit and receive a radio signal to and from at least one of a base station, an external terminal, and a server over a mobile communication network. The radio signal may include various forms of data corresponding to transmission/reception of a voice call signal, a video communication call signal, or a text/multimedia message.

In one or more embodiments, the memory 2170 may store a program for controlling an operation of the AR digital glasses 100. The memory 2170 may include at least one instruction for controlling an operation of the AR digital glasses 100. The programs stored in the memory 2170 may be classified into a plurality of units or modules according to functions thereof. The memory 2170 may include at least one type of storage medium among flash memory, a hard disk, a multimedia card micro, card-type memory (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disc, an optical disc, etc. Some embodiments may be implemented with a recording medium including a computer-executable instruction such as a computer-executable programming module. A computer-readable recording medium may be an available medium that is accessible by a computer, and includes any or all of a volatile medium, a non-volatile medium, a separated medium, and a non-separated medium. The computer-readable recording medium may also include a computer storage medium. The computer storage medium includes all of a volatile medium, a non-volatile medium, a separated medium, and a non-separated medium, and may be implemented by a method or technique for storing information such as a computer-readable instruction, a data structure, a programming module, other data, etc. The storage medium may be provided as a non-transitory storage medium such that the storage medium does not include a signal and is tangible but does not indicate whether data is stored in the storage medium semi-permanently or temporarily. The term "unit" may be a hardware component such as a processor or a circuit, and/or a software component executed by a hardware component such as a processor device.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though embodiments have been described with reference to certain versions thereof; however, other versions are possible. Therefore, the spirit and scope of the embodiments should not be limited to the description of the preferred versions contained herein.

What is claimed is:

1. An augmented reality (AR) device comprising:
a frame;
a plurality of front facing cameras coupled with the frame;
a first electrochromic material coupled with the frame, removably coupled to a power source, and disposed over the plurality of front facing cameras; and
AR display circuitry coupled to the frame and the power source, wherein a mode state of the AR device is modified based on a detected do-not-record permission.

2. The AR device of claim 1, further comprising:
a first arm rotatably coupled to the frame, the first arm including a second electrochromic material removably coupled with the power source; and
a second arm rotatably coupled to the frame, the second arm including a third electrochromic material removably coupled with the power source.

3. The AR device of claim 2, wherein:
the first arm includes a first hinge with a first electrical connector; and the second arm includes a second hinge with a second electrical connector;
wherein the first hinge removably couples the first electrical connector with the power source, and the second hinge removably couples the second electrical connector with the power source.

4. The AR device of claim 3, wherein:
the frame is a glasses frame;
the mode state of the AR device modifies transparency of the first electrochromic material, the second electrochromic material and the third electrochromic material based on respective position of the first arm and the second arm; and
the first electrochromic material is disposed over the plurality of front facing cameras.

5. The AR device of claim 4, further comprising:
a first side facing camera coupled to the first arm; and
a second side facing camera coupled to the second arm;
wherein the second electrochromic material is disposed over the first side facing camera, and the third electrochromic material is disposed over the second side facing camera.

6. The AR device of claim 2, wherein:
the mode state of the AR device is one of an AR mode state, an etiquette mode state and a privacy mode state;
the first electrochromic material, the second electrochromic material and the third electrochromic material are each transparent or opaque based on the mode state of the AR device; and
the mode state of the AR device indicates whether the plurality of front facing cameras, the first side facing camera and the second side facing camera are recording images.

7. The AR device of claim 6, wherein the AR mode state, the etiquette mode state and the privacy mode state are each entered into by the AR device based on location of the AR device, a preference for not being recorded by an individual or location, a personal do-not-record beacon, a geographical beacon or a combination thereof.

8. The AR device of claim 7, wherein the AR mode state of the AR device modifies a recording result for images including blurring, pixilation or overlaying shapes, textures and colors using AR filters to maintain privacy by disguising or obscuring visual identification data.

9. An augmented reality (AR) wearable device comprising:
a frame coupled with a first folding arm and a second folding arm;
a plurality of front facing cameras coupled with the frame;
a first electrochromic material coupled with the frame, removably coupled to a power source, and disposed over the plurality of front facing cameras; and
AR display circuitry coupled with the frame and the power source, wherein a mode state of the AR wearable device provides a viewable indication of one or more recording permissions based on charging or discharging of energy from the first electrochromic material.

10. The AR wearable device of claim 9, further comprising:
a second electrochromic material coupled to the first folding arm and removably coupled with the power source; and
a third electrochromic material coupled to the second folding arm and removably coupled with the power source.

11. The AR wearable device of claim 10, wherein:
the first folding arm includes a first hinge with a first electrical connector; and
the second folding arm includes a second hinge with a second electrical connector;
wherein the first hinge removably couples the first electrical connector with the power source, and the second hinge removably couples the second electrical connector with the power source.

12. The AR wearable device of claim 11, wherein:
the frame is a glasses frame;
the mode state of the AR wearable device modifies transparency of the second electrochromic material and the third electrochromic material based on a received recording permission and respective position of the first folding arm and the second folding arm; and
the first electrochromic material is disposed over the plurality of front facing cameras.

13. The AR wearable device of claim 12, further comprising:
a first side facing camera coupled to the first folding arm; and
a second side facing camera coupled to the second folding arm;
wherein the second electrochromic material is disposed over the first side facing camera, and the third electrochromic material is disposed over the second side facing camera.

14. The AR wearable device of claim 10, wherein:
the mode state of the AR wearable device is one of an AR mode state, an etiquette mode state and a privacy mode state;
the first electrochromic material, the second electrochromic material and the third electrochromic material are each transparent or opaque based on the mode state of the AR wearable device; and
the mode state of the AR wearable device indicates whether the plurality of front facing cameras, the first side facing camera and the second side facing camera are recording images.

15. The AR wearable device of claim 14, wherein:
the AR mode state, the etiquette mode state and the privacy mode state are each entered into by the AR wearable device based on location of the AR wearable device, a preference for not being recorded by an individual or location, a personal do-not-record beacon, a geographical beacon or a combination thereof; and
the AR mode state of the AR wearable device provides a recording result for images including blurring, pixilation or overlaying shapes, textures and colors using AR filters to maintain privacy by disguising or obscuring visual identification data.

16. A method for wearable device image recording privacy, the method comprising:
detecting, by an augmented reality (AR) device including at least one camera, a signal or informative image;
extracting information from the signal or the informative image for determining do-not-record permission;
determining a zone for the determined do-not-record permission;
detecting, by the AR device, a current location with respect to the zone; and
modifying an electrochromic material of the AR device or a recorded image result based on the determined do-not-record permission.

17. The method of claim 16, further comprising:
modifying a mode state of the AR device based on the determined do-not-record permission; and
the mode state of the AR device is one of an AR mode state, an etiquette mode state and a privacy mode state.

18. The method of claim 17, wherein:
the electrochromic material is transparent or opaque based on the mode state of the AR device; and
the mode state of the AR device and the electrochromic material indicates whether the at least one camera is able to record images.

19. The method of claim 18, wherein the AR mode, the etiquette mode state and the privacy mode state are each entered into by the AR device based on the current location of the AR device, a preference for not being recorded by an individual or location, a personal do-not-record beacon, a geographical beacon or a combination thereof.

20. The method of claim 19, wherein the AR mode state of the AR device provides a recording result for images that includes blurring, pixilation or overlaying shapes, textures and colors using AR filters to maintain privacy by disguising or obscuring visual identification data.

* * * * *